United States Patent
Inami

[11] 3,838,612
[45] Oct. 1, 1974

[54] WIRE STRIPPING APPARATUS
[75] Inventor: Toshio Inami, Hasuda, Japan
[73] Assignee: Pilot Man-Nen-Hitsu Kabushiki Kaisha, Tokyo, Japan
[22] Filed: Oct. 29, 1973
[21] Appl. No.: 410,753

[30] Foreign Application Priority Data
Nov. 1, 1972  Japan.............................. 47-126504

[52] U.S. Cl. .............................................. 81/9.51
[51] Int. Cl............................................. H02g 1/12
[58] Field of Search..................................... 81/9.51

[56] References Cited
UNITED STATES PATENTS

| | | | |
|---|---|---|---|
| 988,616 | 4/1911 | Anderson............................ | 81/9.51 |
| 1,433,320 | 10/1922 | Wersel.................................. | 81/9.51 |
| 2,645,959 | 7/1953 | Fuchs et al. ...................... | 81/9.51 X |
| 2,671,363 | 3/1954 | Wells................................... | 81/9.51 |
| 3,530,746 | 9/1970 | Gudmestad.......................... | 81/9.51 |
| 3,630,105 | 12/1971 | Rider................................... | 81/9.51 |

Primary Examiner—Al Lawrence Smith
Assistant Examiner—Roscoe V. Parker
Attorney, Agent, or Firm—Eliot S. Gerber

[57] ABSTRACT

A wire stripping apparatus is provided which comprises a rotatable member supported by a carrier, a slide member mounted on the axle of the rotatable member, and cooperable stripping blades mounted to the head portion of the rotatable member, the stripping blades being closed to sever an insulation of a wire when the slide member moves forwardly at the most advanced position of the carrier and being opened when the slide member moves back at the most retreated position of the carrier.

6 Claims, 3 Drawing Figures

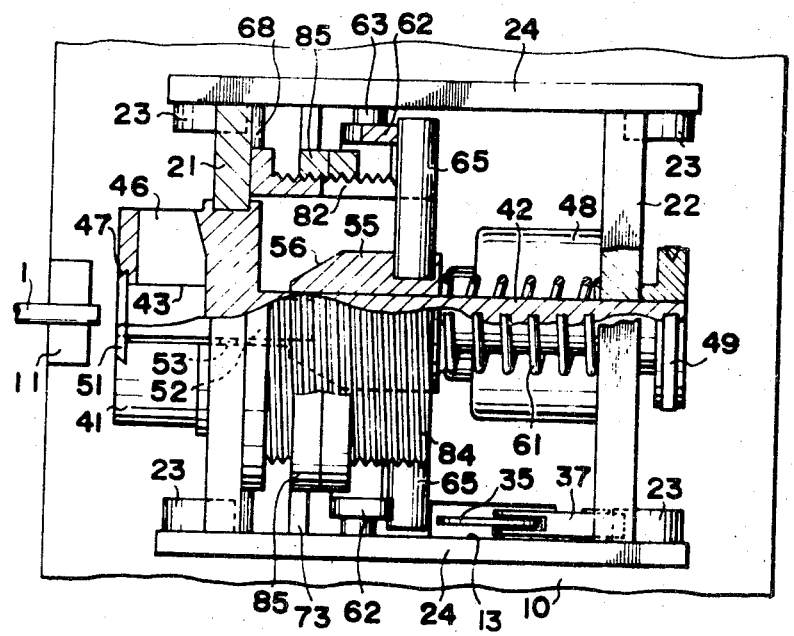
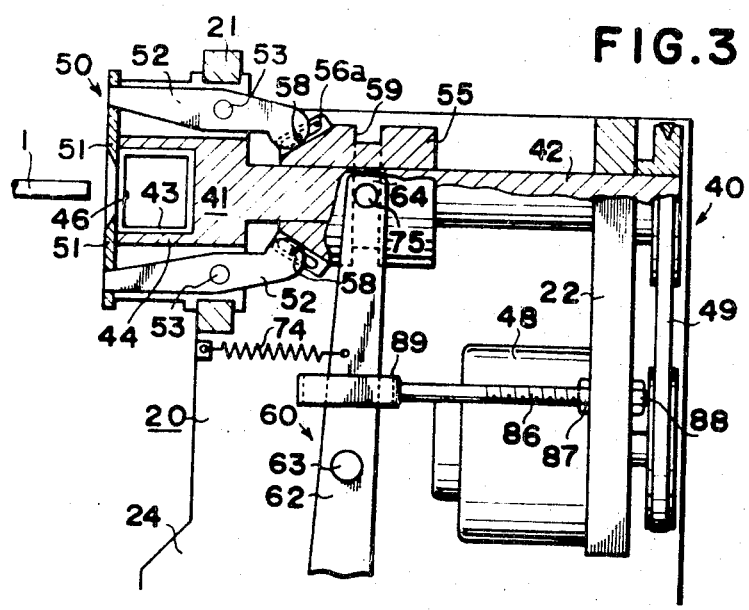

WIRE STRIPPING APPARATUS

This invention relates to an apparatus for stripping an insulation from end portions of an insulated wire to expose the wire at that portion.

A wire stripping apparatus has been known for example by U.S. Pat. No. 3,530,746 issued to Ragnar Gudmestard. In this apparatus, the insulated wire of a predetermined length is gripped at inner portions away from both ends of the wire and is periodically fed to a stripping zone. While the wire is at rest in the stripping zone. cooperable stripping blades advance for a predetermined length with their blades being spaced apart and are partially closed to sever the insulation layer. The blades are retreated axially to the wire with their blades being closed, thereby stripping the insulation of predetermind length from the wire. Finally at the retreated position the stripping blades are opened to be prepared for a subsequent operation.

Generally, there are two cases where the stripped portion of the wire is twisted or not before soldering. So it is desired to provide a wire stripping apparatus which can twist the stripped portion of the wire if desired while the insulation is being stripped. Furthermore, in the wire stripping apparatus, there are common demands to simplify the operational structure of the stripping blades in view of their operation and maintenance and to adjust the depth of cut of the stripping blades so as not to sever the inner wire having various kinds of diameters and thickness of the insulation.

It is therefore an object of the present invention to provide a wire stripping apparatus which can strip the insulation from a wire with the stripped wire portion being twisted, if desired.

It is another object of the present invention to provide a wire stripping apparatus in which operational structure of cooperable stripping blades is made simple.

It is further object of the present invention to provide a wire stripping apparatus in which an adjustment of the depth of cut of the stripping blades can be easily performed even while the apparatus is in operation.

The aformentioned and other objects and features of the present invention will become apparent from the following detailed description of specific embodiments thereof, when read in conjunction with the accompanying drawings, in which:

FIG. 2 is a partially sectioned plane view of the apparatus shown in FIG. 1; and FIG. 3 is a vertically sectioned side view showing the major parts of a second embodiment of the present invention.

Figure 1:
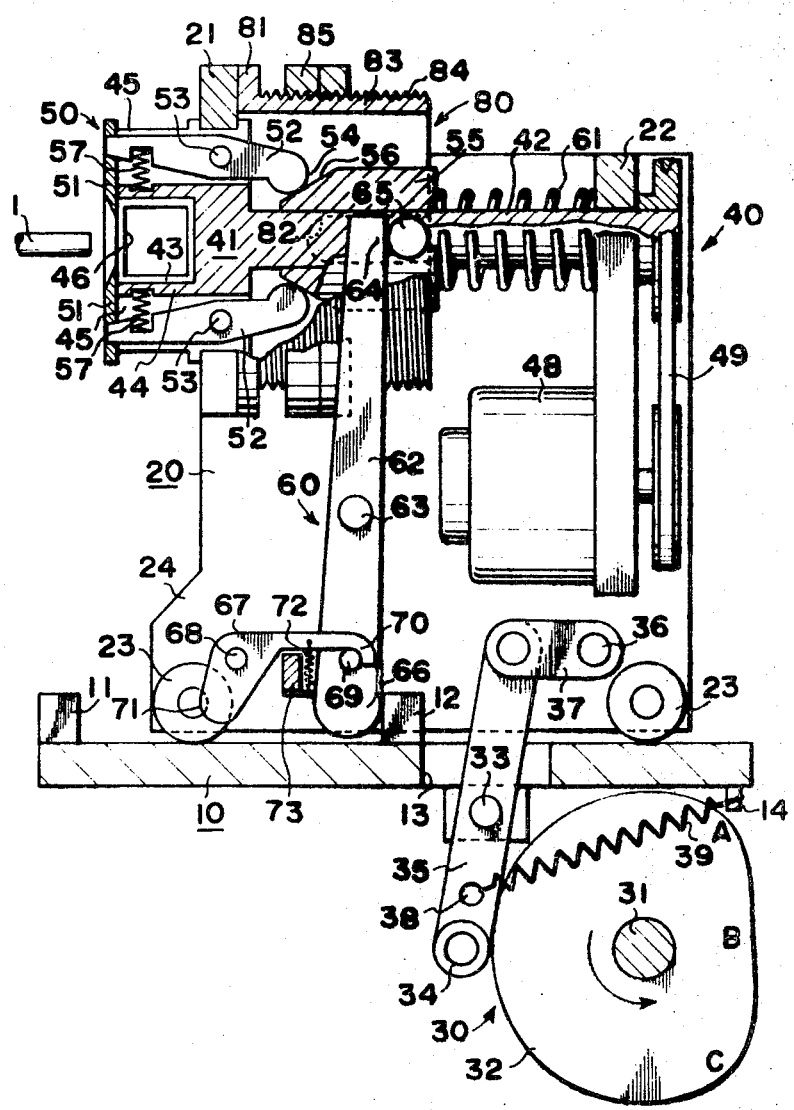
FIG. 1 is a vertically sectioned side view of a wire stripping apparatus according to an embodiment of the present invention.

Referring to Figures, an insulated wire 1 to be stripped is gripped at a portion away from the end thereof and is periodically fed to a stripping zone in the same way as conventional apparatus. The insulated wire 1 in Figures is now in the stripping zone and at rest for stripping.

In reference to a first embodiment of the present invention shown in FIGS. 1 and 2, a lead wire stripping apparatus includes a carrier 20 movably mounted on a supporting base plate 10 on which a pair of front and rear protuberances 11, 12 are provided at center portions thereof. The carrier 20 has four rotatable rollers 23 at its lower four end corners and is reciprocated by a reciprocation means 30. The reciprocation means comprises a cam 32 fixed to a rotary shaft 31 below the base plate 10, a lever 35 which is pivotally connected to the base plate 10 by a pin 33 through an opening 13 provided in the plate 10, the lever 35 having a cam roller 34 rotatably pivoted at its lower end, another lever 37 of which one end is rotatably connected to the upper end of the lever 35 and the other end is rotatably mounted on a side wall 24 of the carrier 20 by a pin 36, and a tension spring 39 which is provided between a pin 38 on the lever 35 and a pin 14 fixed to the lower surface of the base plate 10 in order to assure a positive engagement of the cam roller 34 with the cam 32. Thus, with the rotation of the cam 32, the lever 35 swings about the pin 33 and, thereby, moves the carrier 20 along the axis of the insulated wire 1 to be stripped.

A rotatable member 40 is rotatably supported between a front frame 21 and a rear frame 22 of the carrier 20. The rotatable member 40 comprises a head portion 41 and an axle integrally connected therewith. The head portion 41 is provided with a cylindrical recess 43 at its front central portion. An annular wall portion 44 surrounding the recess 43 is provided with two opposite grooves 45 each of which extends radially in part of the wall portion 44 and parallelly to the axis of the rotatable member 40. Also, the annular wall portion 44 is provided between the opposite grooves 45 with two bores 46 each of which extends radially of the wall portion and is communicated with the cylindrical recess 43. At the front end of the head portion 41 two radial grooves 47 having a wedge-shaped cross section are formed in communication with the opposite grooves 45. The rotatable member 40 is rotated by means of a motor 48 mounted on the rear frame 22 of the carrier 20 and a pulley-belt means 49 which connects the power shaft of the motor 48 with the axle 42 of the rotatable member 40.

Cooperable stripping blades 51 are fitted in the wedge shaped grooves 45 at the front end of the head portion 41. The blades 51 are each connected to the front end of a lever 52 provided in the groove 45. Each lever 52 is pivotally supported by a pin 53 and urged in the direction to open the cooperable stripping blades 51 by a compression spring 57 provided in the groove 45.

A slide member 55 is mounted on the axle 42 of the rotatable member 50 as the axle 42 penetrates through the slide member 55. The slide member 55 has a tapered end portion 56 against which the rear ends of the blades operating levers 52 abut. It will be apparent that if the slide member 55 advances against the pressure of the springs 57 to push out the rear ends 54 of the levers 52 with said tapered end portion 56, the stripping blades 51 close, and on the contrary if the slide member 55 retracts, the blades 51 open.

To the carrier 20 a slide member operating means 60 is provided which cooperates with the front and rear protuberances 11, 12 on the base plate 10 when the carrier 20 is advanced and retreated, respectively. The slide member operating means 60 comprices a compression spring 61 interposed between the rear frame 22 of the carrier 20 and the rear end of the slide member 55 to urge the slide member forwardly, and a lever 62 which is mounted on a pivot 63 supported between the side walls 24 of the carrier 20. The lever 62 has a lower end 66 cooperable with the rear protuberance 12 on the base plate 10 and an upper end 64 cooperable with a member 65 projecting from the slide member 55. The means 60 further comprises a hook member 67 which is pivoted to a pin 68 interconnecting the side walls 24 of the carrier 20. The hook member 67 has a fore end portion 71 cooperable with the fore protuberance 11 and a rear end portion 70 engagable with a pin 69 provided at the lever 62. To assure positive engagement of the hook member 67 with the pin 69, a spring 72 is provided between the hook member 67 and a bar 73 interconnecting the side walls of the carrier 20.

When the carrier 20 advances from the position shown in FIG. 1, the cooperable stripping blades 51 remain spaced apart since the engagement of the hook member 67 with the pin 69 is still maintained and the advancement of the slide member 55 is restricted. When the fore end portion 71 of the hook member 67 acts against the front protuberance 11 as the carrier 20 advances for a slight distance after they contacted with each other, the hook member 67 rotates counterclockwise direction against the pressure of the spring 72 to disengage with the pin 69. At this time the lever 62 is allowed to rotate in the counterclockwise direction, so that the slide member 55 moves forward by the force of the compression spring 61 to make the blades 51 close. Thus, the blades 51 cut the insulation of the wire. The hook member 67 disengaged from the pin 69 is drawn by the spring 72 and supported on a bar for subsequent engagement with the pin 69.

While the carrier is retreating from the most advanced position thereof, the slide member is at the advanced position and the blades are closed, thereby stripping the insulation from the wire. On the retreating movement of the carrier, when the lower end portion 66 of the lever 62 acts against the rear protuberance 12 as the carrier retreats for a slight distance after they contacted with each other, the lever 62 comes to rotate in the clockwise direction about the pin 63 and retracts the slide member 55 by the upper end 64 acting against the member 65 projecting from the slide member 55. Thus, the cooperable stripping blades 51 come to open. Then, by the further rotation of the lever 62, the pin 69 of the lever 62 is caught again by the rear end portion 70 of the hook member 67 and set to the position shown in FIG. 1 with the stripping blades being open.

It is determined by controlling the most advanced position of the slide member 55 that how deeply the cooperable stripping blades 51 bite or cut the insulated wire 1. According to the present embodiment this control is done by a setting means 80 which is fixed on the front frame 21 of the carrier 20. The setting means 80 includes a hollow member 81 which has a cylindrical portion 83 provided therein with horizontal slits 82 open to the rear end and further with threads 84 therearound, and a lock nut or stopper 85 to engage with said threads 84. Guided into the slit 82 is the protruding member 65 of the slide member 55 which contacts the end surface of the stopper 85 and cannot advance any more. Thus, the appropriate setting of the stopper 85 makes it possible to adjust the depth of cut of the blades, and this setting can be done at any time in operation as the setting means 80 is not in motion.

In operation, when the rotating shaft 31 of the cam 32 rotates in the direction of an arrow shown in FIG. 1 and the cam roller 34 rolls on the cam 32 along its periphery between A and B, the carrier 20 advances in the axial direction of the lead wire 1 through the levers 35 and 37. At this time, since the hook member 67 remains engaged with the pin 69 and the cooperable blades 51 are opened, the end portion of the wire 1 enters into the cylindrical recess 43 in the head portion 41 of the rotatable member 40. By the advancement of the carrier 20, when the hook member 67 collides against the front protuberance and is rotated to the extent of releasing the engagement with the pin 69, the slide member 55 is pushed forwardly by the spring 61 until the projecting member 65 contact the stopper 85. Thereby, the cooperable blades 51 partially close to bite the insulation layer of the wire 1.

While the cam roller 34 rolls along the periphery between B and C of the cam 32, the carrier 20 retreats with the blades 51 partially closed to strip the insulation. In this instance, if the motor 48 is not actuated and the rotatable member 40 retreats without rotation, the stripped wire is not twisted. On the contrary when the motor 48 is operating and the rotatable member 40 is rotating, the insulation to be stripped is rotated by the frictional resistance generated by the rotating blades 51 at the severing point of the insulation and further the wire is twisted by the frictional resistance generated between the inner surface of the insulation and the wire.

By the time the insulation stripping is finished, the lower end portion 66 of the lever 62 contacts the rear protuberance 12. As the carrier 20 retreats still further, the lever 62 is rotated clockwise and the upper end portion 64 of the lever 62 causes the slide member 55 to retract against the compression spring 61. Thus the cooperable stripping blades 51 are opened by the springs 57 while the hook member 67 engages with the pin 69 and remains as it is. The stripping insulation is got rid of from the bores 46.

According to a second embodiment shown in FIG. 3, instead of providing the spring 57 as in the first embodiment, a pin 58 provided at the rear end of each lever 52 is inserted in a slanted slit 56a which is formed at the front end portion of the slide member 55. And instead of the compression spring 61 in the first embodiment which directly pushes the rear end surface of the slide member 55, a tension spring 74 is provided which always acts to rotate the lever 62 counterclockwise direction, and also a groove 59 is provided on the periphery of the slide member 55 to engage with a protruding member 75 provided at the upper end portion 64 of the lever 62. Further, displacing the hollow member 81 and stopper 85 in the first embodiment, a frame-like stopper 89 is provided to surround the lever 62 and a threaded shaft 86 is provided of which one end is welded to the stopper 89 and the other is movably supported to the rear frame 22 by means of clamping means 87 and 88, The appropriate setting of this stopper 89 makes it possible to control the counterclockwise rotational angle of the lever 62 and to adjust the most advanced position of the slide member 55 or the depth of cut of the blades 51. Other remaining structures and operation are substantially same as those of the first embodiments.

Although the present invention has been disclosed with reference to the preferred embodiment thereof, many modification and alteration may be made within the spirit of the present invention.

What is claimed is:

1. Wire stripping apparatus comprising:

a supporting base plate 10 on which a pair of protuberances 11, 12 are provided;

carrier means 20 provided upon said supporting base plate for reciprocation in the direction parallel to the axis of an insulated wire to be stripped;

a rotatable member 40 having a head portion 41 connected to an axle 42 thereof, said rotatable member 40 being supported by said carrier;

a slide member 55 slidably mounted on said axle of said rotatable member to take an advanced position and a retracted position;

cooperable stripping blades 51, 51 mounted to said head portion of said rotatable member to take a closed position to sever the insulation and an open position in cooperation with the advance and the retract of said slide member;

means 60 connected with said carrier means and cooperated with said protuberances for operating said slide member, said slide member operating means maintaining said slide member to the advanced position while said carrier means is at the most advance position and is retreating therefrom and maintaining said slide member to the retracted position while said carrier member is at the most retreated position and is advancing therefrom; and means 80 for setting the most advanced position of said slide member.

2. Wire stripping apparatus as claimed in claim 1, wherein said rotatable member 40 has a cylindrical recess 43 formed at the front center portion of said head portion 41 and a pair of; grooves 45, 45 in the annular wall portion 44 excircling said recess, said grooves being parallel to the axis of said rotatable member; said cooperable stripping blades 51, 51 are connected to the front ends of pivotable levers 52, 52 provided in said grooves 45, 45, respectively; and said slide member 55 has a tapered end portion 56 against which the rear ends of said levers abut.

3. Wire stripping apparatus as claimed in claim 1, wherein said rotatable member 40 has a cylindrical recess 43 formed at the front center portion of said head portion 41 and a pair of grooves 45, 45 in the annular wall portion 44 encircling said recess, said grooves being parallel to the axis of said rotatable member; said cooperable stripping blades 51, 51 are connected to the front ends of pivotable levers 52, 52 provided in said grooves 45, 45, respectively; and said slide member 55 has slant grooves 59, 59 with which pins 58, 58 provided at the rear portions of said levers 52, 52 engage.

4. Wire stripping apparatus as claimed in claim 1, wherein said slide member operating means comprises a spring means 61 forwardly urging said slide member 55, a lever 62 pivotably connected to said carrier means 20, said lever having a lower end 66 cooperable with said protuberance 12 provided at the rear portion of said supporting base plate 10 and an upper end 64 cooperable with said slide member, said upper end of said lever retracting said slide member against and spring means when said lower end of said lever acts against said protuberance as said carrier mean is retreated, and a hook member 67 pivotably connected to said carrier means 20, said hook member 67 having a fore end 71 cooperable with the protuberance 11 provided at the fore portion of said supporting base plate 10 and a rear end portion 70 engageable with a pin 69 provided at said lever, said hook member partially rotating in the direction to release the engagement between said rear end portion and said pin when said fore end of said hook member acts against said front protuberance as said carrier means advances, said rear end portion of said hook member engaging with said pin when said lower end of said lever acts against said rear protuberance as said carrier means is retreated.

5. Wire stripping apparatus as claimed in claim 1, wherein said setting means 80 of the most advanced position of said slide member comprises a hollow member 81 opened at its rear portion and fixed to said carrier means 20, said hollow member having a horizontal slit 82 continued to the rear end thereof, a stopper 85 of a lock nut screwed to threads on the outer surface of said hollow member, and a member 65 projecting from said slide member to pass through said slits and to be collidable with said stopper.

6. Wire stripping apparatus as claimed in claim 1, wherein said setting means 80 of the most advanced position of said slide member comprises a frame-like stopper 86 movably connected to said carrier means 20 to restrict inclination angle of said lever.

* * * * *